(12) United States Patent
Nachtrieb

(10) Patent No.: US 10,089,509 B2
(45) Date of Patent: Oct. 2, 2018

(54) APPARATUS AND METHOD FOR MATCHING BARCODES

(71) Applicant: Barcode-Test, LLC, Aurora, IL (US)

(72) Inventor: John D. Nachtrieb, Big Rock, IL (US)

(73) Assignee: Barcode-Test, LLC, Barboursville, VA (US)

( * ) Notice: Subject to any disclaimer, the term of this patent is extended or adjusted under 35 U.S.C. 154(b) by 0 days.

(21) Appl. No.: 15/687,664

(22) Filed: Aug. 28, 2017

(65) Prior Publication Data

US 2018/0060630 A1 Mar. 1, 2018

Related U.S. Application Data

(60) Provisional application No. 62/380,655, filed on Aug. 29, 2016.

(51) Int. Cl.
*G06K 15/00* (2006.01)
*G06K 7/14* (2006.01)
*G06K 7/10* (2006.01)

(52) U.S. Cl.
CPC ....... *G06K 7/1413* (2013.01); *G06K 7/10722* (2013.01); *G06K 7/10881* (2013.01); *G06K 2007/10524* (2013.01)

(58) Field of Classification Search
CPC ....... G06K 19/06009; G06K 19/06056; G06K 7/1434
USPC ....................................................... 235/383
See application file for complete search history.

(56) References Cited

U.S. PATENT DOCUMENTS

| 7,229,021 | B2 * | 6/2007 | Vesikivi | G06K 7/10851 |
| | | | | 235/462.01 |
| 2006/0255132 | A1 * | 11/2006 | Ortiz | G06K 7/1434 |
| | | | | 235/383 |
| 2013/0105568 | A1 * | 5/2013 | Jablonski | G06F 19/3456 |
| | | | | 235/375 |
| 2014/0067674 | A1 | 3/2014 | Leyva | |

* cited by examiner

*Primary Examiner* — Seung Lee
(74) *Attorney, Agent, or Firm* — Chicago IP Law; Steven M. Evans

(57) ABSTRACT

A smartphone and its camera are programmed to function as a barcode scanner, analyze data encoded in a barcode, which also is programmed to "learn" a master barcode, and then scan product barcodes to determine if a product is being loaded onto the correct shipment. A user can choose one of the following modes of operation to start a code match operation: one-to-one, one-to-many, many-to-some, or box mode.

13 Claims, 6 Drawing Sheets

APPARATUS AND METHOD FOR MATCHING BARCODES

CROSS-REFERENCE TO RELATED APPLICATIONS

This non-provisional patent application claims priority and benefit of provisional patent application filed on Aug. 29, 2016, having application No. 62/380,655, which is incorporated by reference.

BACKGROUND OF THE INVENTION

Field of the Invention

The present invention relates generally to barcode scanners, and more particularly, to a smartphone programmed to function as a barcode scanner.

Description of Related Art

Packaging can be a complicated and error-prone operation. What goes into a box or a master carton is usually dictated, not by the manufacturer, but by the manufacturer's customer. For example, in a retail supply chain, the customer will submit a work order to a manufacturer for just what is needed to replenish sold inventory, so that over time, each shipment may be unique. Consequently, a box or a master carton will contain a specific set of items, in various quantities of each item, for a given shipment; a later shipment may have the same set of items, or a different set of items in a completely different configuration of numbers of each item.

The accuracy of the shipment in terms of items and their correct number is extremely important, as retailers replenish their inventory based only on what is selling. Moreover, many retail establishments have very limited storage space, and cannot accommodate many, if any, unexpected items. Shipment accuracy takes on a dimension of security in the pharmaceutical industry. When the retailer submits an order to the manufacturer or distributor, the accuracy of the shipment is a major factor in determining if the shipment has been tampered with. If the arriving shipment does not contain the correct items in their correct quantities, it can be an indication that the shipment has been broken into. Confirmation that all of the shipped and arriving items are not counterfeit or adulterated is extremely important, especially in the pharmaceutical and medical device industries.

One such method of confirming product shipping accuracy is the use of matching barcodes in supply chain and packaging operations. Since virtually all products are shipped within barcoded packaging, barcodes can be used to ensure that only the correct products are included within a shipment. The process of confirming or verifying that the correct products are located within each shipment traditionally has been done manually by workers. A worker, equipped with a printed list of products to be shipped, visually inspects each package to ensure the package is being loaded onto the correct shipment as the package proceeds along a conveyor belt to a master carton or a pallet for shipment. This is a labor intensive, boring, and error-prone process.

Typically, this verification process is done with a Portable Data Terminal (PDT), which is a battery powered computer with a barcode scanner that is programmed with the correct barcodes for each shipment. A worker or operator electronically scans each package during the loading process, such as on a conveyor belt, to confirm that the correct package is being loaded onto the correct shipment. The PDT confirms whether each package belongs in the shipment, typically with a visual "BARCODE MATCH" message, or a "BARCODE MISMATCH" message on a screen to indicate whether a package is being loaded onto the correct shipment.

Most PDTs are relatively large and heavy handheld mobile devices, such as the MC9000-G Series from Symbol Technologies (now Zebra Technologies) or the PSC Falcon 4400 series (now Honeywell). PDT's are expensive, ranging from $600 to $4000 or more. It can be an expensive problem for shippers when PDTs are accidentally lost, misplaced or stolen. Typical PDTs are heavy and bulky, and are tiresome to use. Many PDTs are limited in their functions and capabilities.

Accordingly, there is a need for a device that has all the capabilities of conventional PDTs at less cost, improved functionalities, and no incentive for theft.

ASPECTS AND SUMMARY OF THE PRESENT INVENTION

One aspect of the present invention is to provide barcode matching scanners that reduce the risk of loss or theft by using smartphones. The phone-function of employer-provided smartphones can be disabled, which also reduces the theft-incentive of the device. A misplaced or stolen smartphone can be recovered using its Global Positioning (GPS) sensor.

Another aspect of the present invention is to reduce the risk of loss or theft of PDTs by utilizing smartphones already owned by the workers or employees.

A further aspect of the present invention is to provide a barcode-matching equipped smartphone with increased functionality and computing power.

An additional aspect of the present invention is to provide a more powerful barcode-matching scanner at a lower cost than conventional PDTs.

Another aspect of the present invention is to provide a barcode matching scanner that is more compact, smaller in size, and less weight than conventional PDTs.

In order to achieve these aspects and others, the present invention utilizes a smartphone, such as an LG™ smartphone operating on the Android™ operating system. The present invention can also utilize a handheld and hands-free barcode scanner such as a KDC200 device which communicates to one of a smartphone and tablet by wireless technology such as Bluetooth. Smartphones are lighter, smaller, have more computing power, and are less likely to be stolen than conventional PDTs since the smartphones programmed as a barcode matching device preferably are employees' own property. A smartphone and its camera are programmed in accordance with the present invention to function as a barcode scanner, and analyzing the data encoded in the barcode. While conventional smartphones may include application programs to read barcodes for the purpose of comparing product pricing and information using the internet, a smartphone configured in accordance with the present invention is programmed to "learn" a master barcode and then scan product barcodes to determine if the product is being loaded onto the correct shipment. Barcodes typically used in a shipping operation are one-dimensional (1D) barcodes such as UPC, Code 128 and ITF14, or two-dimensional (2D) barcodes such as QR Code and Data Matrix.

In accordance with a method of the present invention, a barcode matching application for a smartphone is downloaded into the smartphone off the internet, resulting in a barcode matching application (app) icon appearing on the display screen of the smartphone. A user clicks on the icon to open the app, and the first screen shows a Main Menu of four modes of operation. The user must choose one of the following modes of operation to start a code match operation:

1. ONE-TO-ONE
2. ONE-TO-MANY
3. MANY-TO-SOME
4. BOX MODE

In the ONE-TO-ONE mode, the user programs the device with the barcode to be matched by pressing the button labeled "SCAN MASTER." A "Master Barcode" is then programmed into the barcode matching application. This barcode is to be matched to a barcode on an item or product being loaded onto a shipment. The barcode being scanned on an item or product to be loaded onto a shipment is the "Slave Barcode" to be compared to the Master Barcode. This determines if the scanned Slave Barcode matches the Master Barcode, thereby confirming the correct item or product is being loaded onto the correct shipment.

A user presses the SCAN MASTER button to trigger the camera on the smartphone to scan and remember a "Master Barcode." In the ONE-TO-ONE mode, only one master barcode is programmed and only one slave barcode is tested. In the ONE-TO-ONE mode, when the master barcode is learned, the app displays the encoded barcode information. A user then responds to the 'SCAN SLAVE" prompt to test for a code match on subsequent items entering the shipment. As the name of this mode implies, the system then resets and returns to the "SCAN MASTER" mode for the next code match operation.

The ONE-TO-MANY mode operates similarly to the ONE-TO-ONE mode, except that the user programs the system for one MASTER barcode and checks for a match for as many slave barcodes as desired. When finished, the user presses the "FORGET MASTER" button to reset the system for the next operation.

In the MANY-TO-SOME mode, the user or operator can scan up to 50 master barcodes. When the programming operation is complete, the user presses the "SUBMIT MASTER SET" button to begin checking slave barcodes. Acceptable or passing barcodes for a particular shipment do not have to match an entire Master Set of barcodes, but must be included within the Master Set of barcodes. To start a new MANY-TO-SOME operation, the user presses the "FORGET MASTER SET" button or presses the MAIN MENU button to start a new operation in a different mode.

The BOX MODE operates similarly to the MANY-TO-SOME mode, except that a specific number of each MASTER barcode is programmed, and matching slave barcodes must be included in the master set and have the correct barcode number of each barcode. In testing the match of barcodes in the BOX MODE, the system maintains a running log of all scanned slave barcodes and displays a BOX COMPLETE when the correct number of each slave barcodes have been scanned. BOX MODE allows the user to program an unlimited number of boxes, and each box can contain up to 50 items.

The BOX MODE also includes the ability to capture and print a report from the application, using a reporting function included in the app. This is enabled by pressing the REPORTING button at the top of the display in BOX MODE.

In all modes, if a scanned slave barcode does not match a learned Master barcode, a red screen and a large button labeled "BARCODE MISMATCH" appears. A loud FAIL tone also sounds. The user simply proceeds to the next SLAVE scan to continue. No redundant, time-consuming acknowledgement of a failed code match is required.

All screens include a MAIN MENU button in the display to terminate the current operation and/or to restart in the same or a different mode. Other functions that preferably are included are:

1) Code Match Count Report
   a) Running total of OK scans for each LEARNED barcode in each batch or code match event;
   b) Running total of FAIL scans; and
   c) End of batch OK and FAIL count totals In accordance with an apparatus of the present invention, a PDT application is installed on a smartphone to enable the smartphone to learn master barcodes and scan packages during the loading process. Employees can use their own personal smartphone, thus reducing the cost to the employer and reducing the risk of theft or misplacement of the PDF scanner, which is the employee's smartphone. Any smartphone, tablet, or other programmable Android (IOS to come later) device with a camera can be programmed to function as the working apparatus in accordance with the present invention.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed invention and specific embodiments as a basis for designing or modifying other structures for carrying out the same purposes of the present invention, and that such other structures do not depart from the spirit and scope of the invention in its broadest form.

DETAILED DESCRIPTION OF THE PREFERRED EMBODIMENT

Figure 1:
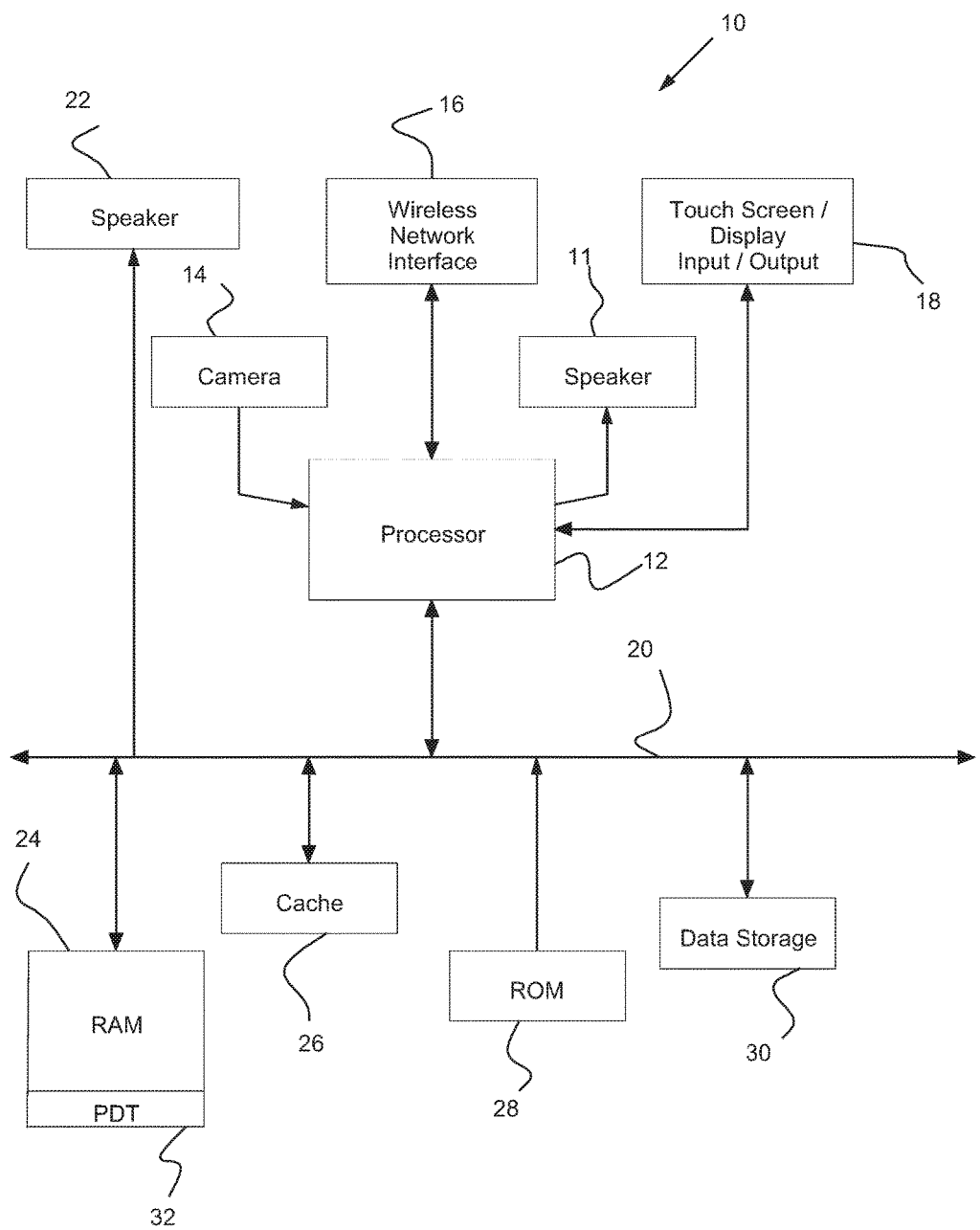
FIG. 1 is a block diagram of a smartphone configured in accordance with an apparatus of the present invention.

Referring now to the drawings, FIG. 1 is a block diagram of a smartphone, tablet or other portable handheld device 10 configured in accordance with the present invention. The portable handheld device 10 preferably is a smartphone operating on the Android® operating system. Other smartphones may be utilized in accordance with the invention, such as an Apple® iPhone. As long as the portable handheld device 10 includes components of a conventional smartphone having a camera, the device 10 can be programmed to function in accordance with the present invention.

The portable handheld device 10, preferably a smartphone, includes electrical components comprising a microprocessor 12, a camera 14, speaker 11, a wireless network interface 16, and a touch screen/display and input 18. Connected on a bus line 20 interconnected to the microprocessor 12 are a speaker 22, a random access memory (RAM)

24, a cache 26, and read only memory (ROM) 28, and a data storage device 30, such as a flash drive.

In accordance with the present invention, a PDT application program 32 is loaded into the RAM 24 from Data storage 30 after the device 10 is activated. The PDT application program 32 enables the device 10 to perform the functions set forth in the method of the present invention. The PDT application program preferably is downloaded from the internet as application program (app) into the data storage 30 of the smartphone device 10.

Figure 2:
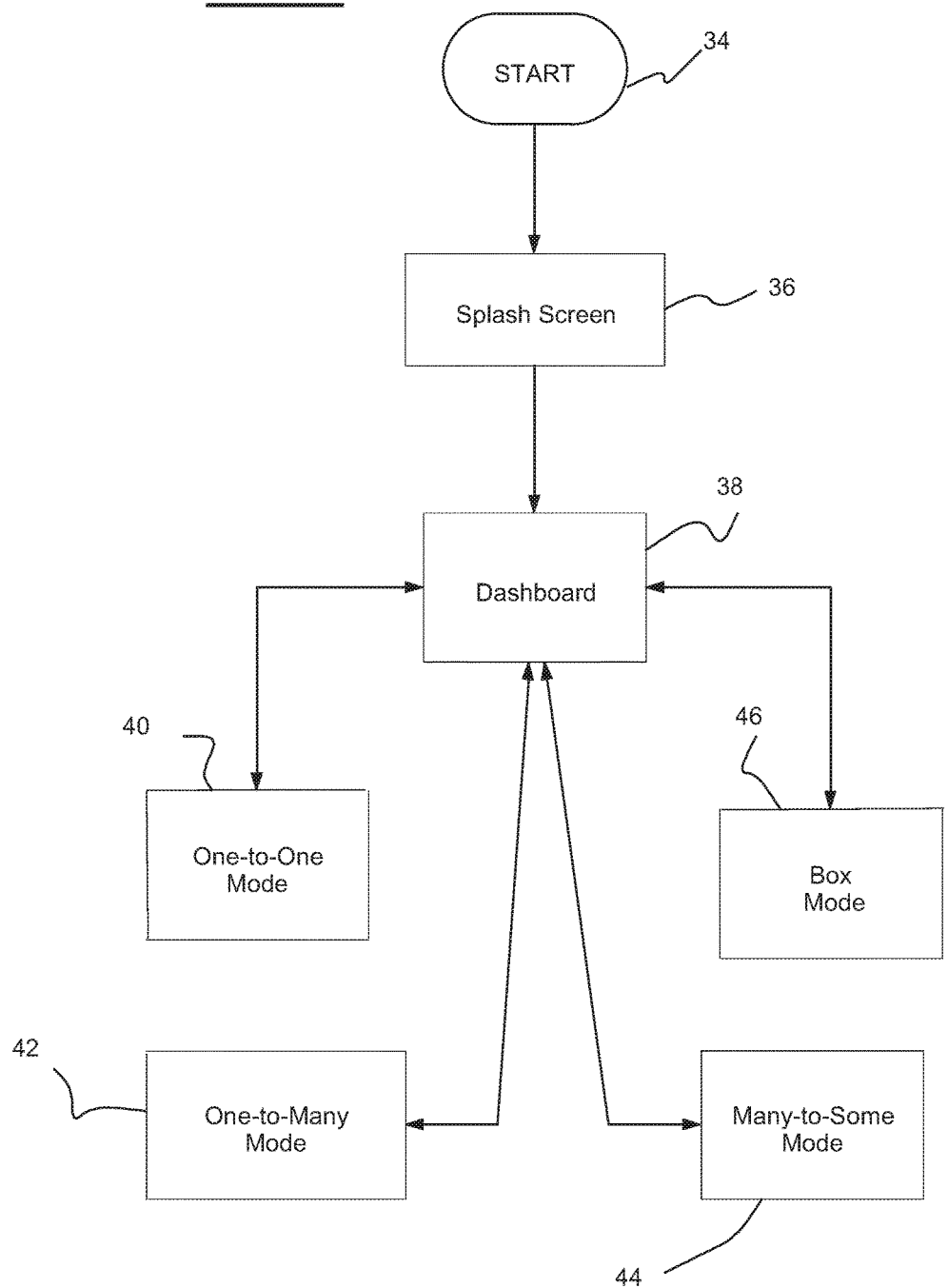
FIG. 2 is an upper level flowchart of a method configured in accordance with the present invention.

FIG. 2 illustrates the initial steps of the method of the present invention. Beginning at the Start 34 of the method, the PDT application "splash screen" 36 of the present invention loads, wherein a graphical control element consisting of a display containing an image or logo and the version of the PDT application of the present invention. Following the splash screen 36, the Dashboard screen 38 appears listing four possible scanning option modes: (1) One-to-One mode 40, (2) One-to-Many mode 42, (3) Many-to-Some mode 44, and (4) Box mode 46. Each scanning option is designed for a special situation.

The "splash screen" also includes user settings which can be accessed by clicking on three dots in the upper right corner of the display. Here the user can select four scanner options:
a Use Flash When Scanning
Use Higher Intensity Flash
Use Auto Focus When Scanning
Use Auto Capture When scanning
The user settings also include a list of barcode symbologies that can be enabled or disabled, in accordance with the user preferences. These settings allow the user to enable only those barcode symbol types that are included in their shipments or packaging, thus enhancing shipment security by disabling barcode types that should not be encountered in a packaging or shipping procedure. Limiting the number of enabled barcode types also speeds up the code match operation of the app.

As discussed above in the summary of the invention, the One-to-One mode 40 matches one master barcode to one slave barcode and then automatically resets the scanner device 10 to begin another sequence of one master barcode to one slave barcode. The One-to-Many mode 42 matches one master barcode to an infinite number of slave barcodes until a user resets the scanner device 10 and begins another sequence of one master barcode to many slave barcodes. The Many-to-Some mode 44 matches a number of master barcodes, for example up to 50 master barcodes, to an undefined number of slave barcodes, so non-matching barcodes are kept out of a shipment, but the whole set falls within the range of items represented by the master set of barcodes.

Box mode 46 is similar to the Many-to-Some mode 44, except in the Box mode 46 products are assigned to a specific box, or carton or pallet. The user defines the "set" by scanning a barcode on a box or carton or pallet, and then defines the items that belong in that box by scanning all the possible content items. Multiple quantities of particular items are scanned multiple times to represent the specific quantity of each item included in the box or shipment. The Box mode 46 code matching operation then checks for the inclusion of each item in a particular box as well as for the correct quantity of each item.

In accordance with the method of the present invention in Box Mode 46, at least two levels of sophistication are provided that include: (1) maintaining a running count of items as they enter the box, so the user can track the list of required items to see if any items or quantities are at or over the target number; and (2) the ability to send the completed list of items to a Bluetooth device such as a personal computer or a printer for saving and printing.

Figure 3:
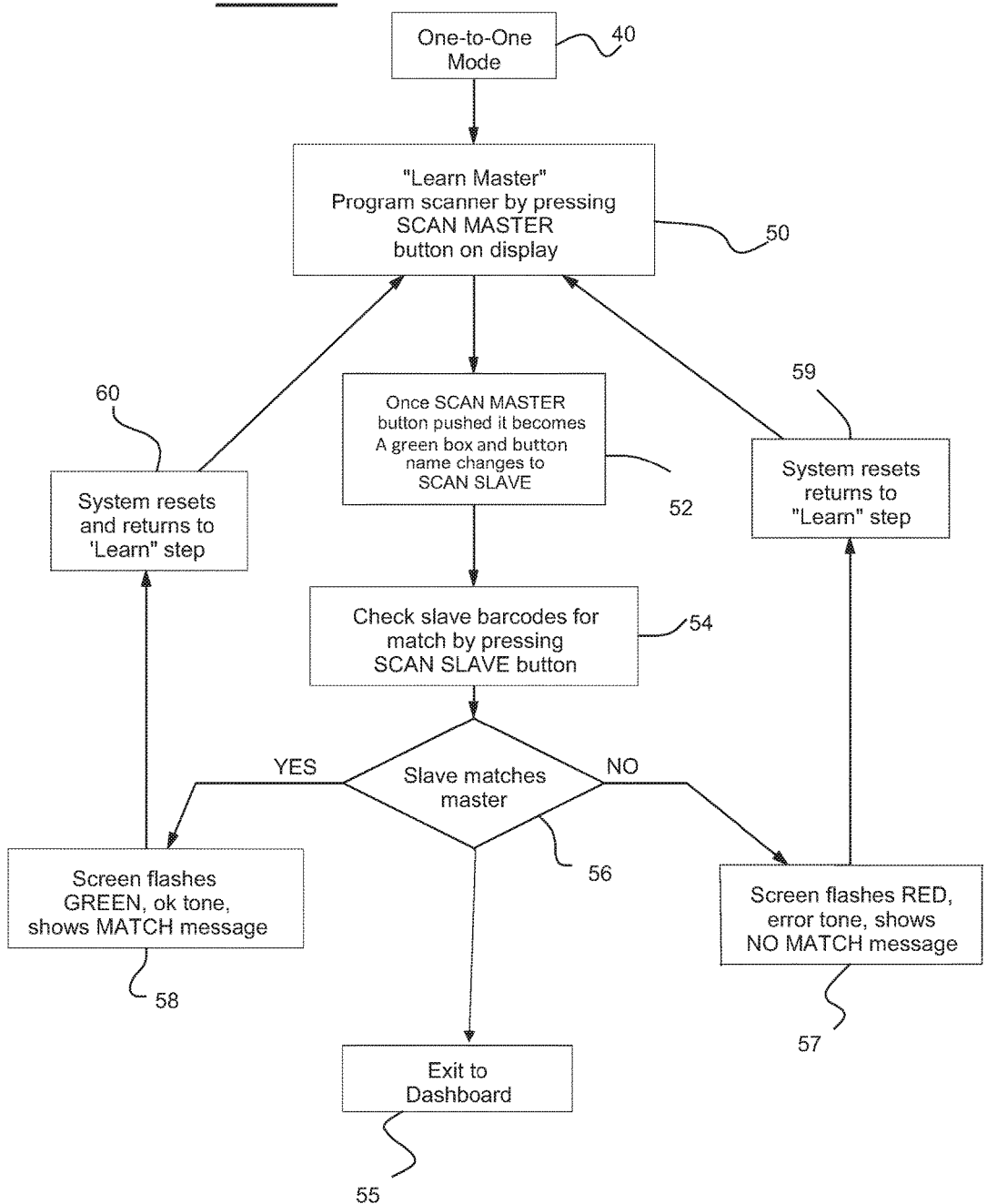
FIG. 3 is a flowchart of a One-to-One mode configured in accordance with a method of the present invention.

FIG. 3 illustrates a flowchart of the One-to-One mode 40 configured in accordance with the method of the present invention. After a user selects the One-to-One mode 40 from the Dashboard screen 38, the method moves to the next step 50 of the scanner 10 to "Learn" a master barcode by selecting the "Scan Master" button on the display screen 18. After the "Scan Master" option or button is selected in step 50 from the display screen 18 of the smartphone 10, the Scan Master button changes to "Scan Slave" barcode in step 52 on the screen 18. Next in step 54 the process or method scans a slave barcode for a match by pressing "Scan Slave" button on the screen 18.

If the Slave barcode matches the Master barcode, then the display 18 flashes green, the speaker 11 chimes an OK tone, and the display 18 shows a "BARCODE MATCH" message in step 58. The scanner 10 then resets in step 60 and returns to the "Learn" step 50. The One-to-One mode repeats this cycle for each matching slave barcode.

If the scanned Slave barcode does not match the learned Master barcode in step 56, then the display screen 18 flashes red, the speaker 11 chimes an error tone, and the display 18 shows a "BARCODE MISMATCH" message in step 57. The scanner 10 then resets at step 59 and returns to the "Learn" mode at step 50. The One-to-One mode repeats this cycle for each non-matching slave barcode. An Exit option or button 55 to a main menu on the Dashboard is available on every screen and step of the One-to-One mode 40, enabling a user to cancel or abort the One-to-One mode 40 and return to the Dashboard screen display at step 38.

Figure 4:
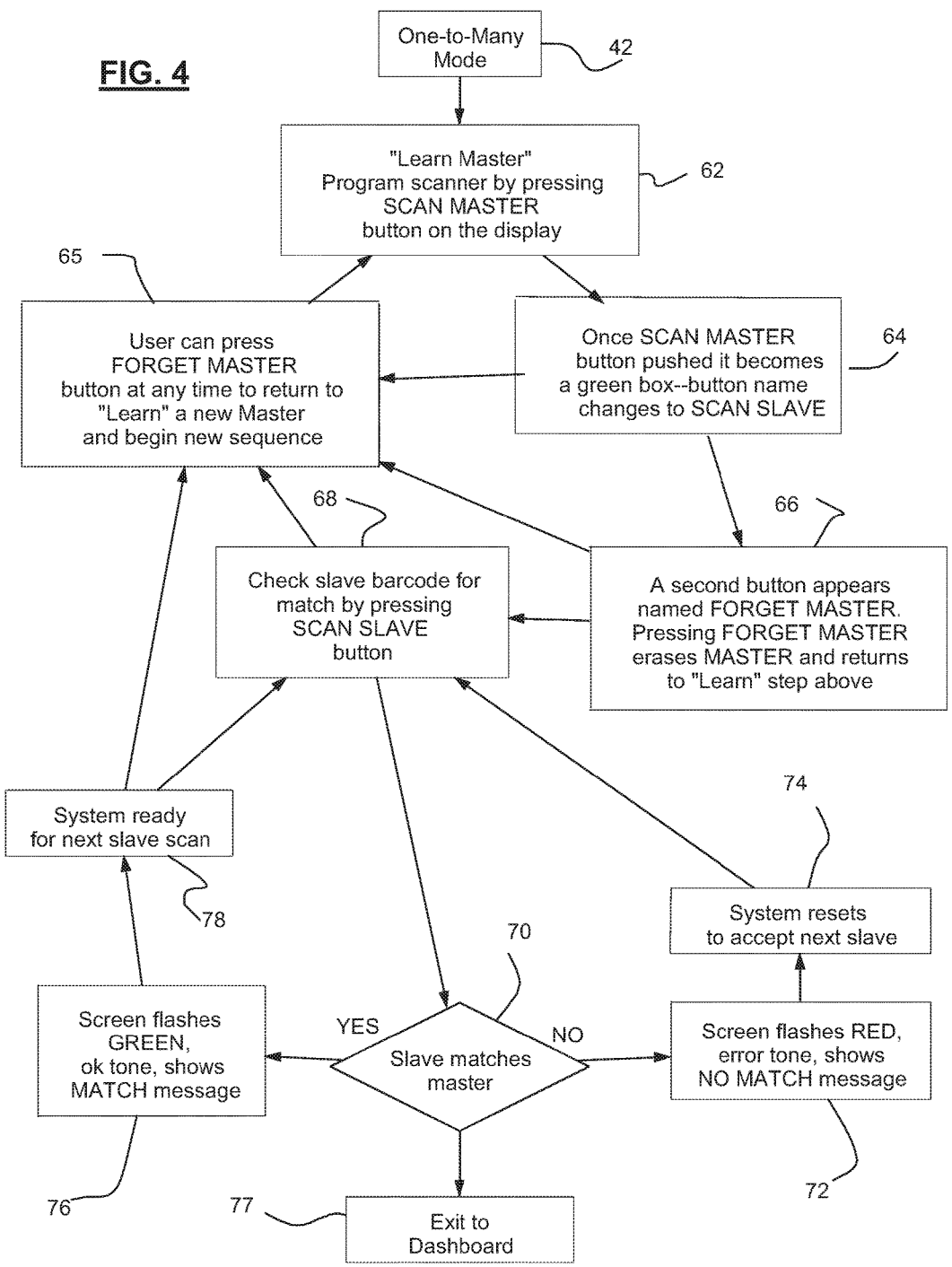
FIG. 4 is a flowchart of a One-to-Many mode configured in accordance with the method the present invention.

Referring to FIG. 4, after returning to the Dashboard display at step 38, a user can select the One-to-Many mode 42 by exiting from another mode or from an initial start from the Dashboard step 38. If a user selects the One-to-Many mode 42 from the Dashboard 38, the method proceeds to Learn step 62 of the One-to-Many mode 42. During the "Learn" step 62 the scanner 10 scans a Master barcode in response to a user pressing the "Scan Master" option or button on the display 18 of the scanner 10. After scanning a master barcode is step 62, the method proceeds to step 64 wherein the Scan Master button or option on the display 18 turns to a different color and the button or option name changes to "Scan Slave." A second button or option "Forget Master" appears on the display 18 in step 66 which enables a user to erase the learned master barcode and return to the Learn step 62 of the One-to-Many mode 42. Additionally, a user can press "Forget Master" in step 65 at any time after learning a new master barcode to return to step 62 and learning a new master barcode and beginning a new One-to-Many mode 42 test sequence.

After the Scan Slave button appears in step 64, and the Forget Master option in step 66 appears, the method proceeds to step 68 wherein the scanner 10, in response to the user pressing "Scan Slave," scans slave barcodes to determine if a scanned slave barcode matches the "Learn" or recorded master barcode. Next in step 70, if a scanned slave barcode matched the stored or learned master barcode from step 62, the method proceeds to step 76 wherein the display screen 18 flashes green, the speaker 11 chimes an OK tone, and the display 18 shows a "BARCODE MATCH" message. The method next proceeds to step 78 wherein the scanner resets for the next slave scan. The method then returns to step 68 to scan another slave barcode in response to a user pressing the Scan Slave button or option. The option also remains available at any step after the "Learn" step 62 to select the "Forget Master" option to erase the store Master Barcode and return to step 62 to "Learn" a new Master Barcode.

If the scanned slave barcode in step 70 does not match the stored Master Barcode from step 62, the method proceeds to step 72 wherein the display screen 18 flashes red, chimes an error tone, and shows a "BARCODE MISMATCH" message. After step 72 the method proceeds to step 74 wherein the scanner 10 resets and is ready to scan a new slave barcode. The method then proceeds to step 68 and ready to scan a new slave barcode in response to a user pressing the Scan Slave button. A user can Exit the One-to-Many mode 42 at step 77 from step 70 by pressing a MAIN MENU button on the display 18 and returning to the Dashboard 38 at step 77.

Figure 5:
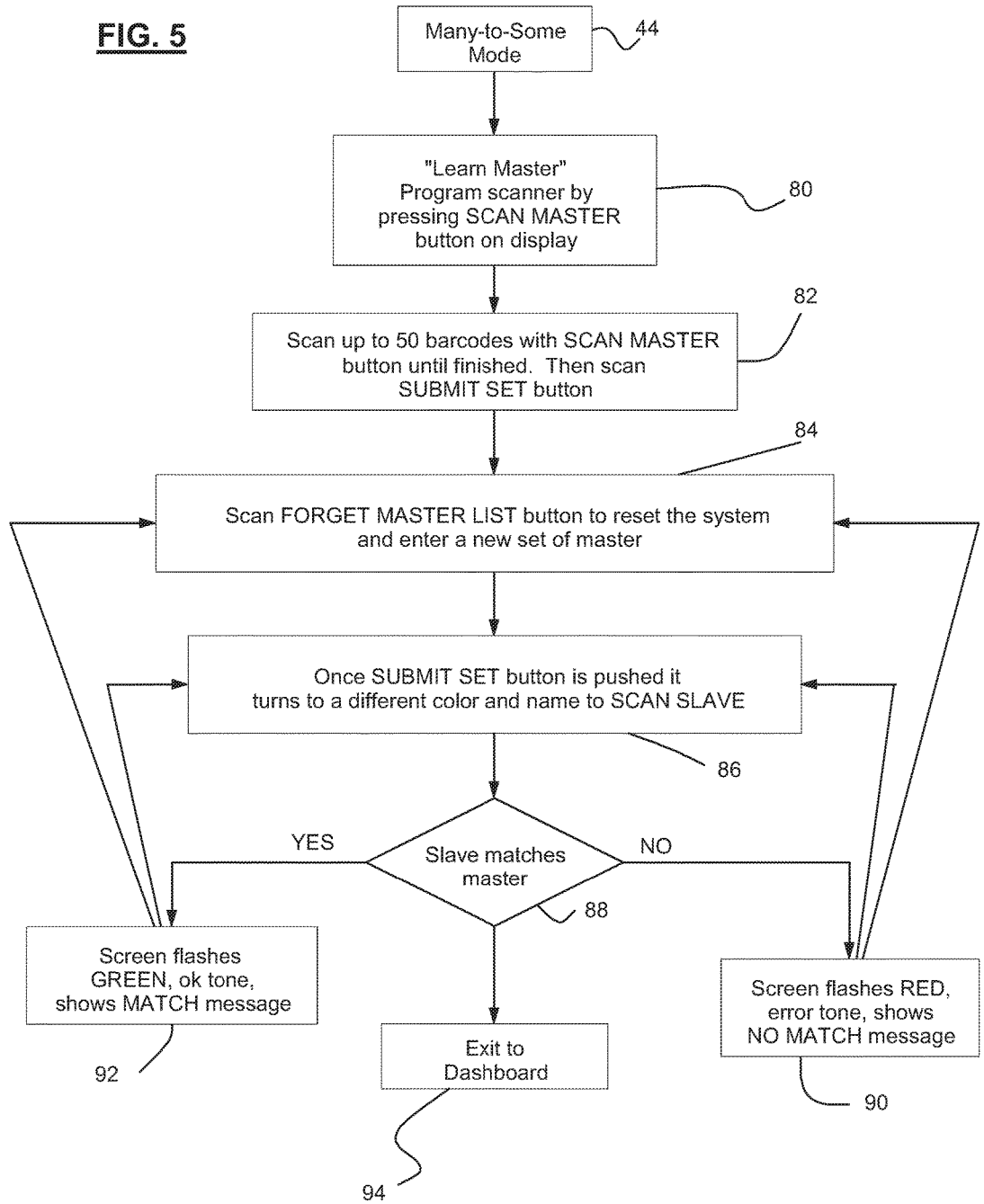
FIG. 5 is a flowchart of a Many-to-Some mode configured in accordance with the method of the present invention.

Referring to FIG. 5, from the Dashboard 38, a user can select the Many-to-Some mode 44. After the Many-to-Some mode 44 is selected from the Dashboard 38, the method proceeds to "Learn" step 80 wherein the scanner 10 scans and records a Master Barcode after the user presses a Scan Master button or option of the display 18. Next in step 82 the scanner can learn or record multiple Master Barcodes, for example up to 50. A user presses the SCAN MASTER button on the display 18 to record each master barcode. After the last desired master barcode is recorded, a user selects the "Submit Set" option or button on the display 18. After all the master barcodes are entered, a "Forget Master List" button or option appears on the display 18 in step 84 enabling a user to erase the recorded master barcodes and enter a new set of master barcodes.

If the user does not erase the stored master barcodes in step 84, the method proceeds to step 86 wherein the display changes to Scan Slave in step 86. Then in step 88 the scanner 10 scans a slave barcode. If the scanned slave barcode matches any of the stored master barcodes, then the method proceeds to step 92 wherein the display screen 18 flashes green, the speaker 11 chimes an OK tone, and display 18 shows a "BARCODE MATCH" message. From step 92 a user simply continues to scan additional slave barcodes by proceeding to step 86.

If a scanned slave barcode does not match any of the stored master barcodes, then the method proceeds to step 90 wherein the display screen 18 flashes red, the speaker 11 chimes an error tone, and the display 18 shows "BARCODE MISMATCH" message. The user can select the "Forget Master List" button at step 84 to enter new master barcodes, or simply continue to scan slave barcodes by pressing the SCAN SLAVE button at step 86. Also, in step 88, if a user selects an option to exit the Many-to-Some mode 44 by pressing the MAIN MENU button the method moves to step 94 to exit the Many-to-Some mode 44 and return to the Dashboard 38.

Figure 6:
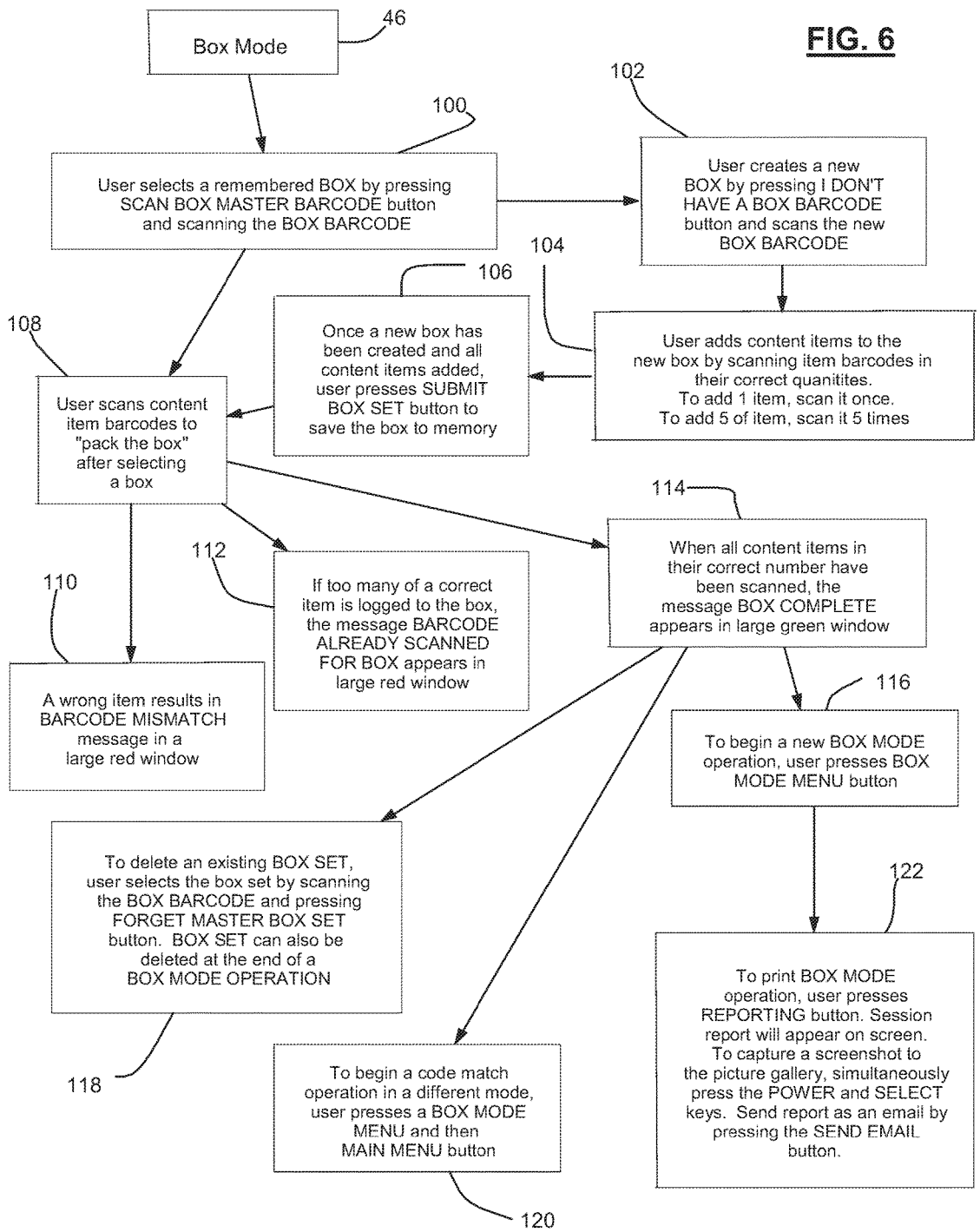
FIG. 6 is a flowchart of a Box mode configured in accordance with the method of the present invention

As shown in FIG. 6, from the Dashboard step 38, a user may select the Box mode 46. After selecting Box mode 46 from the Dashboard 38, the method proceeds to step 100 wherein a user selects a "Remembered Box" from a previous session. The step calls up all prior stored "boxes" and their items, slave barcodes, and quantity of each item of shipment. Preferably a unique barcode corresponds to each unique type of item of a shipment, but the same barcode corresponds to identical items. A "box" can be a pallet, box, or any type of shipping apparatus. A shipper, a logistics company, or generally a product manufacturer provides boxes pre-printed with its barcode, or a self-adhesive label to be affixed to a generic box.

If a user needs to create a new box, the user selects the option "I DON'T HAVE A BOX BARCODE" in step 102 and scans the new box barcode off of the item or its packaging. In step 104 a user scans the barcode of each unique item the number of times corresponding to the quantity of that particular item to be included in a shipment. Once a box has been created and all the contents are defined, a user then proceeds to step 106 to select the "SUBMIT BOX SET" option from the display 18, which saves the box to memory of the device 10.

Next in step 108 the user selects the box by scanning the barcode of that box, which is then recognized by the device 10 from the previously stored boxes in the memory 24 and data storage 30 of the device 10. Then the user scans each item or product to be loaded onto shipment to confirm each item or product is to be loaded onto that corresponding shipment. This is the process for "packing the box."

The user begins the scanning of included box contents items by selecting "SCAN BOX ITEM" option to scan the items of a particular box in step 108. The display 18 changes to Scan Slave and the scanner 10 scans a slave barcode. If the scanned slave barcode matches master barcode, then the display screen 18 flashes green, the speaker 11 chimes an OK tone, and display 18 shows a "BARCODE MATCH" message. This processed is repeated until the correct number of similar items are scanned for a selected box. Once the correct total of similar items are scanned for a selected box in a shipment, the method proceeds to step 114 and a "BOX COMPLETE" message is shown on the display 18.

In response to a scanned slave barcode on an item not matching the master slave of the selected box, the process device 10 displays "BARCODE MISMATCH" in step 110 and flashes red, and the speaker 11 chimes an error tone. If the quantity of identical items for a box has been reached and an additional identical item for a selected box is scanned, the process proceeds to step 112 and displays "BARCODE ALREADY SCANNED FOR BOX" to indicate desired quantity of identical items for a selected box has been reached.

After the correct number of items for a selected box has been reached, a user to proceed to step 118 to delete an existing box of items by scanning the box barcode and selecting "Forget Master Box Set" as step 118. A user may also decide to begin a new box mode operation after filling a prior box is step 114 by proceeding to step 116 and selecting the Box Mode to return to step 46. Additionally, the user can select to proceed to begin a different code match operation from the Dashboard at step 120 from step 114.

A user can save a Box Mode operation in step 122 from the new box mode operation in step 116 by selecting the REPORTING operation. A session report is displayed which can be screen captured to a picture gallery. This is done by pressing the smartphone's SELECT key and the POWER key simultaneously. This report can be emailed.

In accordance with the invention, Box Mode provides a report of loaded items which can be saved, printed, and emailed. BOX MODE collects all code match data for the purposes of generating a report, which is sent by email to a designated recipient. In BOX MODE, a REPORTING button is displayed when a Box is created, with all of its content items in their respective quantities. When a Box has been completed, the user presses the REPORTING button to view the completed box count. The REPORTING button is renamed SEND EMAIL, and the screen changes to SELECT AN EMAIL CLIENT to complete the transmission of the collected data. Once the data has been sent, the user can press the RESET button to begin a new BOX MODE operation, either scanning a saved BOX barcode or creating a new BOX.

While specific embodiments have been shown and described to point out fundamental and novel features of the invention as applied to the preferred embodiments, it will be understood that various omissions and substitutions and changes of the form and details of the invention illustrated and in the operation may be done by those skilled in the art, without departing from the spirit of the invention.

The invention claimed is:

1. A method for scanning barcodes of products to be loaded onto a shipment, comprising the steps of:
providing a smartphone, wherein the smartphone is a cellular phone that performs the functions of a computer, and includes a touch screen interface and display, a camera, a microprocessor, a memory, a speaker, internet access capability, and an operating system capable of downloading and running downloaded applications from the internet;
downloading a barcode matching application software program (APP) off the internet onto the data storage of the smartphone;
initiating and running the barcode matching application software on the smartphone, wherein the barcode matching app performs the following steps:
generating a dashboard on the touch screen of the smartphone providing the following selections: One-to-One mode, One-to-Many mode, Many-to-Some mode, and Box mode, and wherein said One-to-One mode performs the following steps:
scanning a master barcode using the camera of the smartphone and storing the master barcode in memory of the smartphone for comparison to a slave barcode;
scanning a slave barcode using the camera of the smartphone and comparing the master barcode to the slave barcode, wherein the master barcode corresponds to a particular shipment and the slave barcode corresponds to a particular product;
signaling a match on the display and speaker of the smartphone based upon a match between the master barcode and the slave barcode, thus signaling a particular product is being loaded onto a correct particular shipment; and
signaling a non-match on the display and speaker of the smartphone based upon a non-match between the master barcode and the slave barcode, thus signaling a particular product is incorrectly being loaded onto a particular shipment.

2. The method of claim 1, further comprising the steps of:
scanning a new a master barcode using the camera of the smartphone and storing the master barcode in memory of the smartphone for comparison to a slave barcode;
scanning a slave barcode using the camera of the smartphone and comparing the master barcode to the slave barcode;
signaling a match on the display and speaker of the smartphone based upon a match between the master barcode and the slave barcode; and
signaling a non-match on the display and speaker of the smartphone based upon a non-match between the master barcode and the slave barcode.

3. The method of claim 1, wherein signaling a non-match on the display includes displaying a text message on a red background.

4. A method for scanning barcodes of products to be loaded onto a shipment, comprising the steps of:
providing a smartphone, wherein the smartphone is a cellular phone that performs the functions of a computer, and the smartphone includes a display and touch screen interface, a microprocessor, a memory, a camera, a speaker, internet access capability, and an operating system capable of downloading and running downloaded applications from the internet;
downloading a many-to-some mode barcode matching application software program (APP) off the internet onto the data storage of the smartphone;
initiating and running the many-to-some mode barcode matching APP on the smartphone, wherein the many-to-some mode barcode matching APP performs the following steps:
scanning a plurality of master barcodes using the camera of the smartphone and storing the plurality of master barcodes in the memory of the smartphone for comparison to slave barcodes;
scanning a plurality of slave barcodes using the camera of the smartphone and comparing the plurality of scanned master barcodes to the plurality of slave barcodes, wherein each of the plurality of master barcodes corresponds to a particular shipment and each of the plurality of slave barcodes corresponds to a particular product;
signaling a match on the display and the speaker of the smartphone based upon a match between one of the plurality of master barcodes and one of the plurality of slave barcodes, thus signaling a particular product is being loaded onto a correct particular shipment; and
signaling a non-match on the display and the speaker of the smartphone based upon a non-match between any of the plurality of master barcodes and any of the plurality of slave barcodes, thus signaling a particular product is incorrectly being loaded onto a particular shipment.

5. The method of claim 4, further comprising the steps of:
deleting the plurality of master barcodes from the memory;
scanning a plurality of new master barcodes using the camera of the smartphone and storing the plurality of new master barcodes in the memory of the smartphone for comparison to slave barcodes; and
scanning a plurality of new slave barcodes using the camera of the smartphone and comparing the plurality of scanned new master barcodes to the plurality of new slave barcodes.

6. The method of claim 4, wherein the smartphone signals a match between a master barcode and a slave barcode by flashing green on the display screen and playing an ok tone on the speaker.

7. The method of claim 4, wherein the smartphone signals no match between master barcodes and slave barcodes by flashing red on the display screen and playing a no match tone on the speaker.

8. A method for scanning barcodes of products to be loaded onto a shipment, comprising the steps of:
providing a smartphone, wherein the smartphone is a cellular phone that performs the functions of a computer, and the smartphone includes a display and touch screen interface, a microprocessor, a memory, a camera, a speaker, internet access capability, and an operating system capable of downloading and running downloaded applications from the internet;
downloading a box mode barcode matching application software program (APP) off the internet onto the data storage of the smartphone;

initiating and running the box mode barcode matching APP on the smartphone, wherein the box mode barcode matching APP performs the following steps:

identifying a shipment box by scanning its shipment box barcode using the camera of the smartphone, wherein the shipment box barcode corresponds to a plurality of master barcodes for that shipment box;

scanning a plurality of slave barcodes on products using the camera of the smartphone and comparing the plurality of scanned master barcodes in the shipment box to the plurality of slave barcodes to determine if a product belongs in that shipment box;

signaling a match on the display and the speaker of the smartphone based upon a match between one of the plurality of master barcodes in the shipment box and one of the plurality of slave barcodes;

signaling a non-match on the display and the speaker of the smartphone based upon a non-match between any of the plurality of master barcodes in the shipment box and any of the plurality of slave barcodes; and tracking number of matching scanned slave barcodes on each scanned product to determine correct number and type of products that have been loaded into a shipment.

9. The method of claim 8, further comprising the steps of:
creating a shipment box, which includes the steps of:

identifying a shipment box by scanning a shipment box barcode;

scanning a plurality of master barcodes using the camera of the smartphone to create a database of master barcodes corresponding to products to be loaded into a shipment; and storing the plurality of master barcodes in the memory of the smartphone for comparison to slave barcodes of potential products to be included in the shipment.

10. The method of claim 8, further comprising the step of:
signaling correct number of slave barcodes for a particular product have been scanned once a correct number of slave barcodes for a particular product have been scanned and loaded.

11. The method of claim 8, further comprising the step of:
signaling too many slave barcodes for a product have been scanned once a correct number of slave barcodes for that product have been scanned and loaded, and an additional slave barcode for that product is being scanned.

12. The method of claim 8, further comprising the step of:
signaling a slave barcode for a product has been scanned and number count for the product is within maximum corresponding to the shipment box.

13. The method of claim 8, further comprising the step of:
printing contents of scanned slave barcodes matching master barcodes of the shipment box.

* * * * *